United States Patent
Matsui et al.

(10) Patent No.: US 10,976,564 B2
(45) Date of Patent: Apr. 13, 2021

(54) ISOLATOR, LIGHT SOURCE DEVICE, OPTICAL TRANSMITTER, AND OPTICAL AMPLIFIER

(71) Applicant: KYOCERA Corporation, Kyoto (JP)

(72) Inventors: Naoki Matsui, Tokyo (JP); Tomoya Sugita, Machida (JP); Hiromichi Yoshikawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/643,473

(22) PCT Filed: Aug. 20, 2018

(86) PCT No.: PCT/JP2018/030645
§ 371 (c)(1),
(2) Date: Feb. 28, 2020

(87) PCT Pub. No.: WO2019/044557
PCT Pub. Date: Mar. 7, 2019

(65) Prior Publication Data
US 2020/0363584 A1 Nov. 19, 2020

(30) Foreign Application Priority Data

Aug. 29, 2017 (JP) .............................. JP2017-164820
Aug. 29, 2017 (JP) .............................. JP2017-164822

(51) Int. Cl.
*G02B 27/28* (2006.01)
*G02B 6/125* (2006.01)
*G02B 6/12* (2006.01)

(52) U.S. Cl.
CPC ............. *G02B 27/28* (2013.01); *G02B 6/125* (2013.01); *G02B 6/12004* (2013.01); *G02B 2006/12157* (2013.01)

(58) Field of Classification Search
None
See application file for complete search history.

(56) References Cited

U.S. PATENT DOCUMENTS

| 3,990,777 A | 11/1976 | Auracher |
| 2008/0266644 A1 | 10/2008 | Sigalas et al. |
| 2011/0311181 A1 | 12/2011 | Yoshie et al. |
| 2016/0341981 A1 | 11/2016 | Carroll et al. |

FOREIGN PATENT DOCUMENTS

| JP | S618403 B2 | 3/1986 |
| JP | H0310212 A | 1/1991 |
| JP | H0764023 A | 3/1995 |
| JP | 2003302603 A | 10/2003 |

*Primary Examiner* — Jerry Rahll
(74) *Attorney, Agent, or Firm* — Studebaker & Brackett PC

(57) ABSTRACT

An isolator includes a first waveguide and a second waveguide on a substrate having a substrate surface, the first waveguide and the second waveguide located along the substrate surface and overlapping each other as viewed from the substrate. The first waveguide and the second waveguide each include a core and a clad. The core has a first surface facing the substrate surface, and a second surface opposite to the first surface. The clad contacts the first surface and the second surface of the core. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

17 Claims, 14 Drawing Sheets

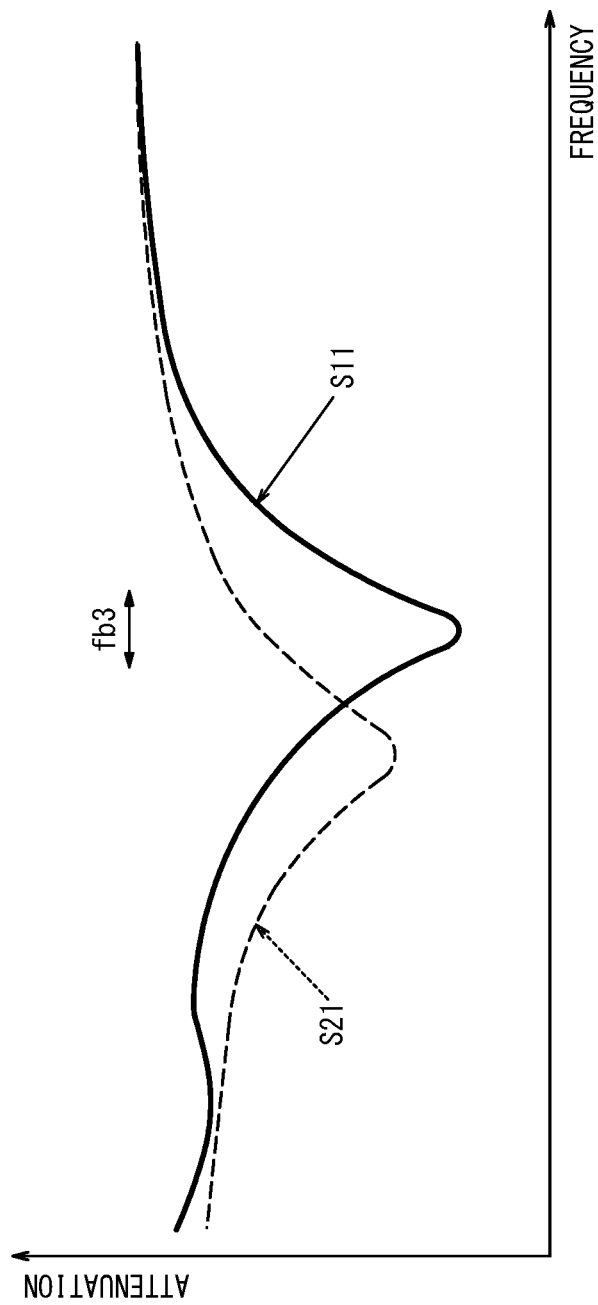

ISOLATOR, LIGHT SOURCE DEVICE, OPTICAL TRANSMITTER, AND OPTICAL AMPLIFIER

CROSS REFERENCE TO RELATED APPLICATION

This application claims priority to and the benefit of Japanese Patent Application No. 2017-164820 filed on Aug. 29, 2017 and Japanese Patent Application No. 2017-164822 filed on Aug. 29, 2017, the entire disclosures of which are incorporated herein by reference.

TECHNICAL FIELD

The present disclosure relates to an isolator, a light source device, an optical switch, an optical amplifier, and a data center.

BACKGROUND

Structures in which an isolator, for which the transmittance differs depending on the propagation direction of electromagnetic waves, includes a non-reciprocal phase shifter are known (for example, see PTL 1).

CITATION LIST

Patent Literature

PTL 1: JP 2003-302603 A

SUMMARY

An isolator according to an embodiment of the present disclosure comprises a first waveguide and a second waveguide on a substrate having a substrate surface, the first waveguide and the second waveguide located along the substrate surface and overlapping each other as viewed from the substrate. The first waveguide and the second waveguide each include a core and a clad. The core has a first surface facing the substrate surface, and a second surface opposite to the first surface. The clad contacts the first surface and the second surface of the core. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

A light source device according to an embodiment of the present disclosure comprises an optical isolator and a light source. The optical isolator includes a first waveguide and a second waveguide on a substrate having a substrate surface, the first waveguide and the second waveguide located along the substrate surface and overlapping each other as viewed from the substrate. The first waveguide and the second waveguide each include a core and a clad. The core has a first surface facing the substrate surface, and a second surface opposite to the first surface. The clad contacts the first surface and the second surface of the core. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends. The light source is optically connected to the port.

An isolator according to an embodiment of the present disclosure comprises a first waveguide and at least one second waveguide. The first waveguide has a first end and a second end, and has a port for input and output of electromagnetic waves at each of the first end and the second end. The at least one second waveguide has both ends, is located along the first waveguide, and is coupled to the first waveguide. At any operation frequency, the first waveguide and the at least one second waveguide have a coupling coefficient in a case where electromagnetic waves input from the second end propagate toward the first end that is larger than a coupling coefficient in a case where electromagnetic waves input from the first end propagate toward the second end.

A light source device according to an embodiment of the present disclosure comprises an optical isolator and a light source. The optical isolator includes a first waveguide and at least one second waveguide. The first waveguide has a first end and a second end and has a port for input and output of electromagnetic waves at each of the first end and the second end. The at least one second waveguide has both ends, is located along the first waveguide, and is coupled to the first waveguide. At any operation frequency, the first waveguide and the at least one second waveguide have a coupling coefficient in a case where electromagnetic waves input from the second end propagate toward the first end that is larger than a coupling coefficient in a case where electromagnetic waves input from the first end propagate toward the second end. The light source is optically connected to the port.

An isolator according to an embodiment of the present disclosure comprises a first waveguide and a second waveguide on a substrate having a substrate surface, the first waveguide and the second waveguide arranged side by side along the substrate surface. The first waveguide and the second waveguide each include a core and a clad. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

A light source device according to an embodiment of the present disclosure comprises an optical isolator and a light source. The optical isolator includes a first waveguide and a second waveguide on a substrate having a substrate surface, the first waveguide and the second waveguide arranged side by side along the substrate surface. The first waveguide and the second waveguide each include a core and a clad. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends. The light source is optically connected to the port.

An optical transmitter according to an embodiment of the present disclosure comprises a light source device including an optical isolator and a light source. The optical isolator includes a first waveguide and a second waveguide on a substrate having a substrate surface, the first waveguide and the second waveguide located along the substrate surface and overlapping each other as viewed from the substrate. The first waveguide and the second waveguide each include a core and a clad. The core has a first surface facing the substrate surface, and a second surface opposite to the first surface. The clad contacts the first surface and the second surface of the core. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends. The light source is optically connected to the port. The optical transmitter has a light modulation function.

An optical transmitter according to an embodiment of the present disclosure comprises a light source device including an optical isolator and a light source. The optical isolator includes a first waveguide and at least one second waveguide. The first waveguide has a first end and a second end and has a port for input and output of electromagnetic waves at each of the first end and the second end. The at least one second waveguide has both ends, is located along the first waveguide, and is coupled to the first waveguide. At any operation frequency, the first waveguide and the at least one second waveguide have a coupling coefficient in a case where electromagnetic waves input from the second end propagate toward the first end that is larger than a coupling coefficient in a case where electromagnetic waves input from the first end propagate toward the second end. The light source is optically connected to the port. The optical transmitter has a light modulation function.

An optical transmitter according to an embodiment of the present disclosure comprises a light source device including an optical isolator and a light source. The optical isolator includes a first waveguide and a second waveguide on a substrate having a substrate surface, the first waveguide and the second waveguide arranged side by side along the substrate surface. The first waveguide and the second waveguide each include a core and a clad. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends. The light source is optically connected to the port. The optical transmitter has a light modulation function.

An optical switch according to an embodiment of the present disclosure comprises an optical isolator. The optical isolator includes a first waveguide and a second waveguide on a substrate having a substrate surface, the first waveguide and the second waveguide located along the substrate surface and overlapping each other as viewed from the substrate. The first waveguide and the second waveguide each include a core and a clad. The core has a first surface facing the substrate surface, and a second surface opposite to the first surface. The clad contacts the first surface and the second surface of the core. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

An optical switch according to an embodiment of the present disclosure comprises an optical isolator. The optical isolator includes a first waveguide and at least one second waveguide. The first waveguide has a first end and a second end, and has a port for input and output of electromagnetic waves at each of the first end and the second end. The at least one second waveguide has both ends, is located along the first waveguide, and is coupled to the first waveguide. At any operation frequency, the first waveguide and the at least one second waveguide have a coupling coefficient in a case where electromagnetic waves input from the second end propagate toward the first end that is larger than a coupling coefficient in a case where electromagnetic waves input from the first end propagate toward the second end.

An optical switch according to an embodiment of the present disclosure comprises an optical isolator. The optical isolator includes a first waveguide and a second waveguide on a substrate having a substrate surface, the first waveguide and the second waveguide arranged side by side along the substrate surface. The first waveguide and the second waveguide each include a core and a clad. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

An optical amplifier according to an embodiment of the present disclosure comprises an optical isolator. The optical isolator includes a first waveguide and a second waveguide on a substrate having a substrate surface, the first waveguide and the second waveguide located along the substrate surface and overlapping each other as viewed from the substrate. The first waveguide and the second waveguide each include a core and a clad. The core has a first surface facing the substrate surface, and a second surface opposite to the first surface. The clad is located to contact the first surface and the second surface of the core. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

An optical amplifier according to an embodiment of the present disclosure comprises an optical isolator. The optical isolator includes a first waveguide and at least one second waveguide. The first waveguide has a first end and a second end, and has a port for input and output of electromagnetic waves at each of the first end and the second end. The at least one second waveguide has both ends, is located along the first waveguide, and is coupled to the first waveguide. At any operation frequency, the first waveguide and the at least one second waveguide have a coupling coefficient in a case where electromagnetic waves input from the second end propagate toward the first end that is larger than a coupling coefficient in a case where electromagnetic waves input from the first end propagate toward the second end.

An optical amplifier according to an embodiment of the present disclosure comprises an optical isolator. The optical isolator includes a first waveguide and a second waveguide on a substrate having a substrate surface, the first waveguide and the second waveguide arranged side by side along the substrate surface. The first waveguide and the second waveguide each include a core and a clad. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

A data center according to an embodiment of the present disclosure is configured to communicate comprising a device including an optical isolator. The optical isolator includes a first waveguide and a second waveguide on a substrate having a substrate surface, the first waveguide and the second waveguide located along the substrate surface and overlapping each other as viewed from the substrate. The first waveguide and the second waveguide each include a core and a clad. The core has a first surface facing the substrate surface, and a second surface opposite to the first surface. The clad contacts the first surface and the second surface of the core. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

A data center according to an embodiment of the present disclosure is configured to communicate comprising a device including an optical isolator. The optical isolator includes a first waveguide and at least one second waveguide. The first waveguide has a first end and a second end, and has a port for input and output of electromagnetic waves at each of the first end and the second end. The at least one second waveguide has both ends, is located along the first waveguide, and is coupled to the first waveguide. At any operation frequency, the first waveguide and the at least one second waveguide have a coupling coefficient in a case where electromagnetic waves input from the second end propagate toward the first end that is larger than a coupling coefficient in a case where electromagnetic waves input from the first end propagate toward the second end.

A data center according to an embodiment of the present disclosure is configured to communicate comprising a device including an optical isolator. The optical isolator includes a first waveguide and a second waveguide on a substrate having a substrate surface, the first waveguide and the second waveguide arranged side by side along the substrate surface. The first waveguide and the second waveguide each include a core and a clad. The first waveguide has a first end and a second end, and has a port for input and output of electromagnetic waves at each of the first end and the second end. The core of the second waveguide includes a non-reciprocal member in at least one part of a cross section intersecting a direction in which the second waveguide extends.

BRIEF DESCRIPTION OF THE DRAWINGS

In the accompanying drawings:

FIG. 25 is a graph illustrating an example of a simulation result of transmission characteristics.

DETAILED DESCRIPTION

Figure 1:
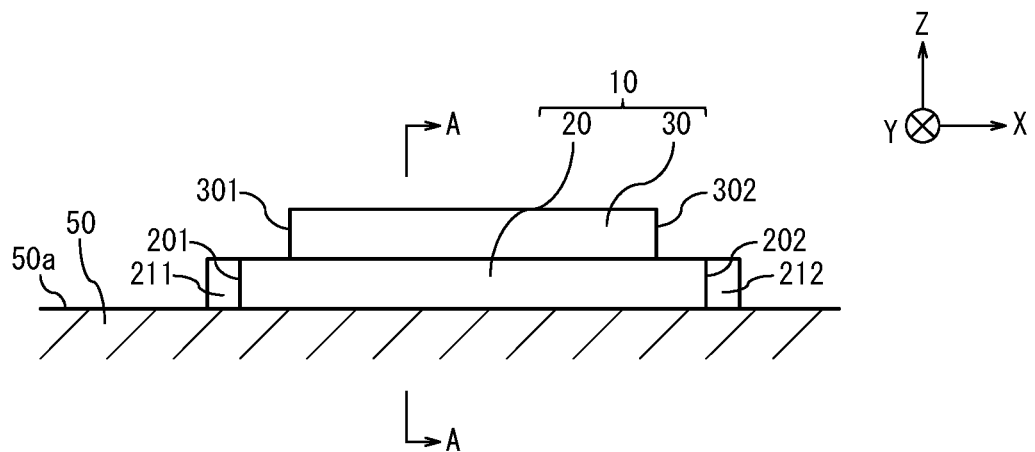
FIG. 1 is a side view illustrating an example of the structure of an isolator according to an embodiment.

As illustrated in FIG. 1, an isolator 10 according to an embodiment includes a first waveguide 20 and a second waveguide 30. On a substrate 50 having a substrate surface 50a, the first waveguide 20 and the second waveguide 30 are located along the substrate surface 50a and extend in the X-axis direction.

The substrate 50 may contain a conductor such as metal, a semiconductor such as silicon, glass, resin, or the like.

One of the first waveguide 20 and the second waveguide 30 is in contact with the substrate surface 50a. In the case where the first waveguide 20 is in contact with the substrate surface 50a, the second waveguide 30 is located on the first waveguide 20. In the case where the second waveguide 30 is in contact with the substrate surface 50a, the first waveguide 20 is located on the second waveguide 30. The first waveguide 20 and the second waveguide 30 overlap each other as viewed from the substrate 50. It is hereafter assumed that the first waveguide 20 is in contact with the substrate surface 50a. In this case, the second waveguide 30 is located on the first waveguide 20.

The first waveguide 20 has a first end 201 and a second end 202 respectively on the positive side and the negative side of the X axis. The first waveguide 20 has a first port 211 and a second port 212 through which electromagnetic waves are input and output, respectively at the first end 201 and the second end 202. Electromagnetic waves input into the first waveguide 20 from the first port 211 travel toward the second port 212 along the X axis. Electromagnetic waves input into the first waveguide 20 from the second port 212 travel toward the first port 211 along the X axis. The first port 211 and the second port 212 may each be configured as an end surface of a core 21, or as a coupler connected to an external device and capable of propagating electromagnetic waves.

The second waveguide 30 has ends 301 and 302 respectively on the positive side and the negative side of the X axis. In other words, the second waveguide 30 has both ends. The second waveguide 30 is located along the first waveguide 20, and coupled to the first waveguide 20. The number of second waveguides 30 is not limited to one, and may be two or more.

The first waveguide 20 and the second waveguide 30 may be located along each other, in at least one part in the direction in which they extend. The first waveguide 20 and the second waveguide 30 may be located parallel to each other, in at least one part in the direction in which they extend. The first waveguide 20 or the second waveguide 30 may have a linear structure. The first waveguide 20 and the second waveguide 30 having such simple structures can be easily formed on the substrate 50.

Two waveguides located along each other are also referred to as parallel waveguides. In the parallel waveguides, electromagnetic waves input into one waveguide can, while propagating in the waveguide, move into the other waveguide. That is, electromagnetic waves propagating in the first waveguide 20 can move into the second waveguide 30, and electromagnetic waves propagating in the second waveguide 30 can move into the first waveguide 20.

A parameter representing the proportion of electromagnetic waves that move from one waveguide into the other waveguide in the parallel waveguides is also referred to as a coupling coefficient. In the case where no electromagnetic waves move from one waveguide into the other waveguide, the coupling coefficient is 0. In case where all electromagnetic waves move from one waveguide into the other waveguide, the coupling coefficient is 1. The coupling coefficient can be a value of 0 or more and 1 or less. The coupling coefficient can be determined based on the shapes of the waveguides, the distance between the waveguides, the length for which the waveguides extend along each other, or the like. For example, the coupling coefficient can be higher as the shapes of the waveguides are more similar to each other. Regarding the distance between the waveguides, for example, the distance between the first waveguide 20 and the second waveguide 30 may be the distance between a core 21 and a core 31. The coupling coefficient can vary depending on the distance for which electromagnetic waves propagate in a waveguide. That is, in the parallel waveguides, the coupling coefficient can differ depending on the position in the direction in which each waveguide extends. A local maximum value of the coupling coefficient can be determined based on the shapes of the waveguides, the distance between the waveguides, or the like. The local maximum value of the coupling coefficient can be a value of 1 or less.

In the parallel waveguides, the coupling coefficient at the start point of the segment in which the waveguides extend along each other is 0. The length from the start point to the position at which the coupling coefficient is the local maximum value is also referred to as a coupling length. In the case where the length for which the waveguides extend along each other is equal to the coupling length, the coupling coefficient at the end point of the segment in which the waveguides extend along each other can be the local maximum value. The coupling length can be determined based on the shapes of the waveguides, the distance between the waveguides, or the like.

Electromagnetic waves which have moved from the first waveguide 20 into the second waveguide 30 propagate in the second waveguide 30 in the same direction as in the first waveguide 20. In the case where electromagnetic waves reach the end 301 or 302 in the second waveguide 30, the electromagnetic waves can be emitted from the end 301 or 302, or reflected by the end 301 or 302 and travel in the opposite direction.

Figure 2:
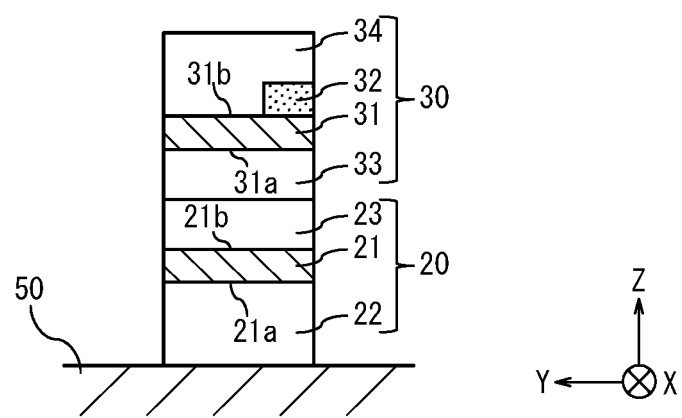
FIG. 2 is a cross-sectional view along A-A in FIG. 1.

As illustrated in FIG. 2, the first waveguide 20 includes the core 21 and clads 22 and 23. The core 21 and the clads 22 and 23 extend in the X-axis direction. The clads 22 and 23 are located respectively on the negative side and the positive side of the Z axis with respect to the core 21. The clad 22 is located on the substrate 50 side as viewed from the core 21. The clad 23 is located on the side opposite to the substrate 50 as viewed from the core 21. The clad 23 is located on the second waveguide 30 side as viewed from the core 21. The clad 22, the core 21, and the clad 23 are stacked in order as viewed from the substrate 50. The clads 22 and 23 sandwich the core 21 in the direction in which the first waveguide 20 and the second waveguide 30 overlap. The clads 22 and 23 are located on both sides of the core 21 in the direction in which the first waveguide 20 and the second waveguide 30 overlap. The core 21 may have a first surface 21a on the substrate 50 side, and a second surface 21b on the side opposite to the first surface 21a. The clads 22 and 23 may be respectively in contact with the first surface 21a and the second surface 21b.

The second waveguide 30 includes the core 31, a non-reciprocal member 32, and clads 33 and 34. The core 31, the non-reciprocal member 32, and the clads 33 and 34 extend in the X-axis direction. The non-reciprocal member 32 may be located on the positive side of the Z axis with respect to the core 31. The non-reciprocal member 32 may be located on the negative side of the Z axis with respect to the core 31. Two or more non-reciprocal members 32 may be arranged side by side in the positive direction or the negative direction of the Y axis on either side of the core 31.

As illustrated in FIG. 2, the shapes of the core 31 and the non-reciprocal member 32 as viewed from a cross section intersecting the X axis are configured such that they are not point-symmetric. The shapes of the core 31 and the non-reciprocal member 32 may also be configured such that they are not line-symmetric. The core 31 and the non-reciprocal member 32 are also collectively referred to as an asymmetrical core. The asymmetrical core includes the core 31 and the non-reciprocal member 32. The asymmetrical core may have the non-reciprocal member 32 in at least one part of the cross section intersecting the X axis. The core 31 may contain at least one type of dielectric. The non-reciprocal member 32 may be in contact with the surface of the at least one type of dielectric on the substrate 50 side, or the surface of the at least one type of dielectric on the opposite side.

The degree of symmetry can be used as an index representing whether the cross section of the asymmetrical core is close to point-symmetric. The degree of symmetry may be expressed by the proportion in which the cross-sectional shape of the asymmetrical core and a cross-sectional shape obtained by rotating the cross-sectional shape of the asymmetrical core 180 degrees about a predetermined point match. A cross-sectional shape with a higher degree of symmetry is closer to point symmetry. The asymmetrical core may have a low degree of symmetry in its cross-sectional shape.

In the cross section of the asymmetrical core, the area of the core 31 may be larger than the area of the non-reciprocal member 32. Thus, most of electromagnetic waves can propagate in the core 31. This can reduce the loss of electromagnetic waves in the second waveguide 30.

In the cross section of the asymmetrical core, the core 31 may be located in a part in which the intensity of electromagnetic waves propagating in the asymmetrical core is highest. Thus, a high intensity part of electromagnetic waves can propagate in the core 31. This can reduce the loss of electromagnetic waves in the second waveguide 30.

The clads 33 and 34 are located respectively on the negative side and the positive side of the Z axis with respect to the asymmetrical core. The clad 33 is located on the substrate 50 side as viewed from the asymmetrical core. The clad 34 is located on the side opposite to the substrate 50 as viewed from the asymmetrical core. The clad 34 is located on the second waveguide 30 side as viewed from the asymmetrical core. The clad 33, the asymmetrical core, and the clad 34 are stacked in order as viewed from the substrate 50. The clads 33 and 34 sandwich the asymmetrical core. The clads 33 and 34 are located on both sides of the asymmetrical core in the direction in which the first waveguide 20 and the second waveguide 30 overlap. The core 31 may have a first surface 31a on the substrate 50 side, and a second surface 31b on the side opposite to the first surface 31a. The clads 33 and 34 may be respectively in contact with the first surface 31a and the second surface 31b.

The cores 21 and 31 and the clads 22, 23, 33, and 34 may contain a dielectric. The cores 21 and 31 are also referred to as dielectric waveguides. The relative permittivity of the core 21 may be higher than the relative permittivity of each of the clads 22 and 23. The relative permittivity of the core 31 may be higher than the relative permittivity of each of the clads 33 and 34. The clads 23 and 33 may be made of the same dielectric material. The clads 23 and 33 may be formed integrally. In the case where the clads 23 and 33 are formed integrally, the isolator 10 can be formed easier. The relative permittivity of each of the cores 21 and 31 and the clads 22, 23, 33, and 34 may be higher than the relative permittivity of air. As a result of the relative permittivity of each of the cores 21 and 31 and the clads 22, 23, 33, and 34 being higher than the relative permittivity of air, leakage of electromagnetic waves from the first waveguide 20 and the second waveguide 30 can be prevented. This can reduce loss caused by radiation of electromagnetic waves from the isolator 10 to the outside.

The core 21 or 31 may be made of, for example, silicon (Si). The clad 22, 23, 33, or 34 may be made of, for example, quartz glass ($SiO_2$). The relative permittivity of silicon is about 12, and the relative permittivity of quartz glass is about 2. Silicon is capable of propagating electromagnetic waves having a near-infrared wavelength of about 1.2 μm to about 6 μm with low loss. In the case where the core 21 or 31 is made of silicon, the core 21 or 31 can propagate electromagnetic waves having a wavelength of 1.3 μm band or 1.55 μm band used in optical communication, with low loss.

The first waveguide 20 which includes the core 21 and the clads 22 and 23 and the second waveguide 30 which includes the asymmetrical core and the clads 33 and 34 may satisfy guided wave conditions in a single mode. In the case where the first waveguide 20 and the second waveguide 30 satisfy the guided wave conditions in the single mode, the waveform of a signal propagating in each of the first waveguide 20 and the second waveguide 30 is unlikely to be distorted. The isolator 10 that combines the first waveguide 20 and the second waveguide 30 satisfying the guided wave conditions in the single mode can be suitable for optical communication.

The relative permittivity of the core 21 or 31 may be distributed uniformly in the Z-axis direction, or distributed so as to change in the Z-axis direction. For example, the relative permittivity of the core 21 may be distributed so as to be highest at the center in the Z-axis direction and decrease toward each of the clads 22 and 23. In this case, the core 21 can propagate electromagnetic waves according to the same principle as in graded index type optical fibers.

Electromagnetic waves input into the core 21 from the first end 201 of the first waveguide 20 via the first port 211 propagate in the core 21 of the first waveguide 20 extending along the X axis, toward the second end 202. The direction from the first end 201 to the second end 202 is also referred to as a first direction. Electromagnetic waves propagating in the core 21 can move into the core 31 of the second waveguide 30, in proportion to a coupling coefficient that is based on the distance of propagation in the first direction in the core 21. The coupling coefficient in the case where electromagnetic waves propagate in the first direction in the core 21 is also referred to as a first coupling coefficient.

Electromagnetic waves input into the core 21 from the second end 202 of the first waveguide 20 via the second port 212 propagate in the core 21 of the first waveguide 20 extending along the X axis, toward the first end 201. The direction from the second end 202 to the first end 201 is also referred to as a second direction. Electromagnetic waves propagating in the core 21 propagate to the core 31 of the second waveguide 30, in proportion to a coupling coefficient that is based on the distance of propagation in the second direction in the core 21. The coupling coefficient in the case where electromagnetic waves propagate in the second direction in the core 21 is also referred to as a second coupling coefficient.

The asymmetrical core of the second waveguide 30 can have propagation characteristics that differ between when electromagnetic waves propagate in the first direction and when electromagnetic waves propagate in the second direction. In the case where the propagation characteristics of the asymmetrical core differ depending on the propagation direction of electromagnetic waves, the first coupling coefficient and the second coupling coefficient can be different from each other. That is, the non-reciprocal member 32 can make the first coupling coefficient and the second coupling coefficient different from each other.

The non-reciprocal member 32 may be made of a material having propagation characteristics that differ between when electromagnetic waves propagate in the first direction and when electromagnetic waves propagate in the second direction. Such a material having propagation characteristics that differ depending on the propagation direction of electromagnetic waves is also referred to as a non-reciprocal material. For example, the non-reciprocal member 32 may contain a magnetic material such as magnetic garnet, ferrite, iron, or cobalt. The relative permittivity of the non-reciprocal member 32 can be expressed by a tensor as in Formula (1):

$$\varepsilon_r = \begin{bmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{bmatrix} \qquad (1)$$

Each element of the tensor may be expressed as a complex number. The number used as an index of each element may correspond to the X axis, the Y axis, and the Z axis. A tensor having complex numbers as elements and representing relative permittivity is also referred to as a complex relative permittivity tensor.

The non-reciprocal member 32 may contain a predetermined concentration of the non-reciprocal material. The predetermined concentration may vary in a cross section intersecting the X axis. The predetermined concentration may vary in at least one part as viewed along the polarization direction of electromagnetic waves input into the isolator 10.

Figure 3:
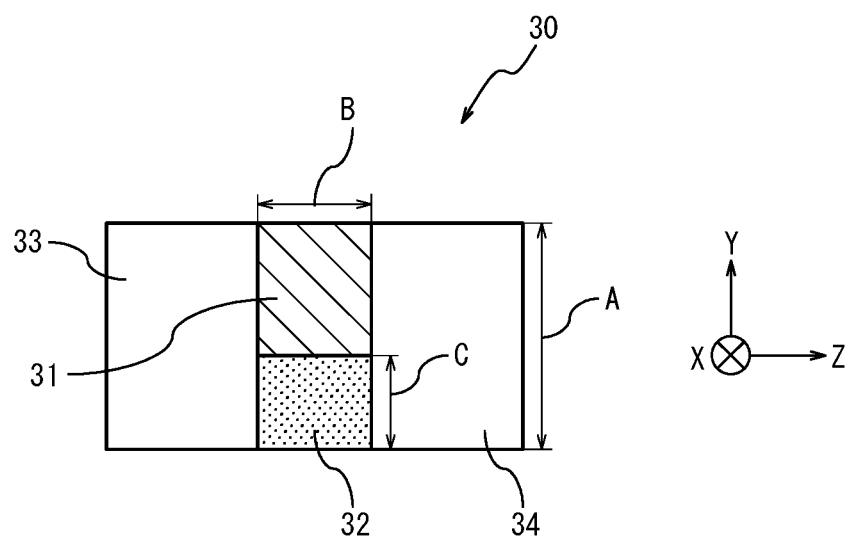
FIG. 3 is a cross-sectional view illustrating an example of the structure of a non-reciprocal member.

The second waveguide 30 may have a shape illustrated in FIG. 3, in a cross section intersecting the X axis. The dimension of the second waveguide 30 in the Y-axis direction is denoted by A. The dimension of each of the core 31 and the non-reciprocal member 32 in the Z-axis direction is denoted by B. The dimension of the non-reciprocal member 32 in the Y-axis direction is denoted by C. The non-reciprocal member 32 is provided side by side with the core 31 along the Y axis, and located on the negative side of the Y axis. The second waveguide 30 extends in the X-axis direction so that its dimension in the X-axis direction is a predetermined length. The non-reciprocal member 32 has relative permittivity expressed by a complex relative permittivity tensor.

Figure 4:
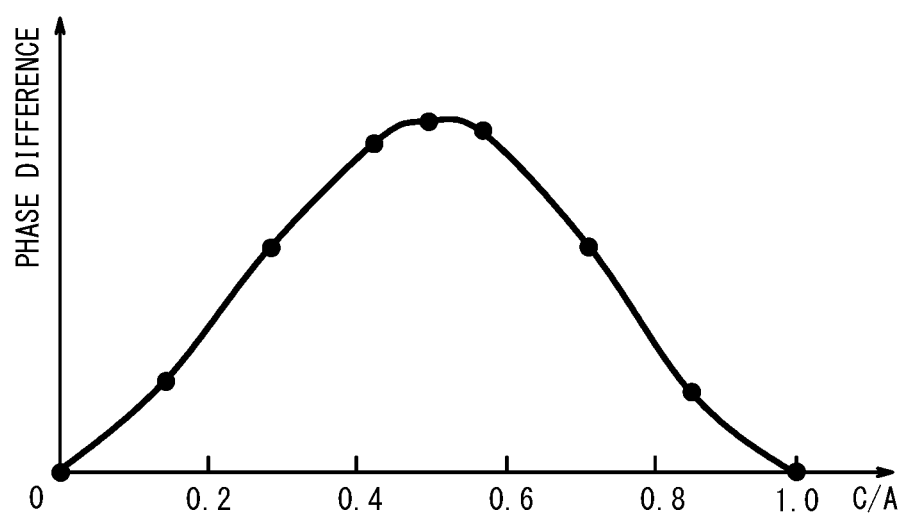
FIG. 4 is a graph illustrating an example of a phase difference in the non-reciprocal member in FIG. 3.

For the second waveguide 30 illustrated in FIG. 3, the difference between the phase of electromagnetic waves propagating in the first direction in the second waveguide 30 and the phase of electromagnetic waves propagating in the second direction in the second waveguide 30 can be calculated by simulation. The difference between the phase of electromagnetic waves propagating in the first direction and the phase of electromagnetic waves propagating in the second direction is also referred to as a phase difference. As illustrated in a graph in FIG. 4, the phase difference can vary depending on the value of C/A. The value of C/A represents the proportion occupied by the non-reciprocal member 32 when viewing the asymmetrical core in the Z-axis direction. According to the graph in FIG. 4, the phase difference can increase when the value of C/A approaches 0.5. The phase difference can be adjusted by changing the value of C/A. The non-reciprocity of attenuation of electromagnetic waves can be large in the case where the phase difference is large. That is, when the phase difference is larger, the difference between the attenuation in the case where electromagnetic waves propagate in the first direction and the attenuation in the case where electromagnetic waves propagate in the second direction can be larger. The second waveguide 30 can be configured to have a property such that the attenuation of electromagnetic waves differs depending on the propagation direction of electromagnetic waves, by adjusting the value of C/A. The property in which the attenuation of electromagnetic waves differs depending on the propagation direction of electromagnetic waves is also referred to as non-reciprocity. In the case where the value of C/A approaches 0.5, the degree of symmetry of the asymmetrical core decreases. In other words, the non-reciprocity of the second waveguide 30 can be increased by decreasing the degree of symmetry of the asymmetrical core.

Figure 5:
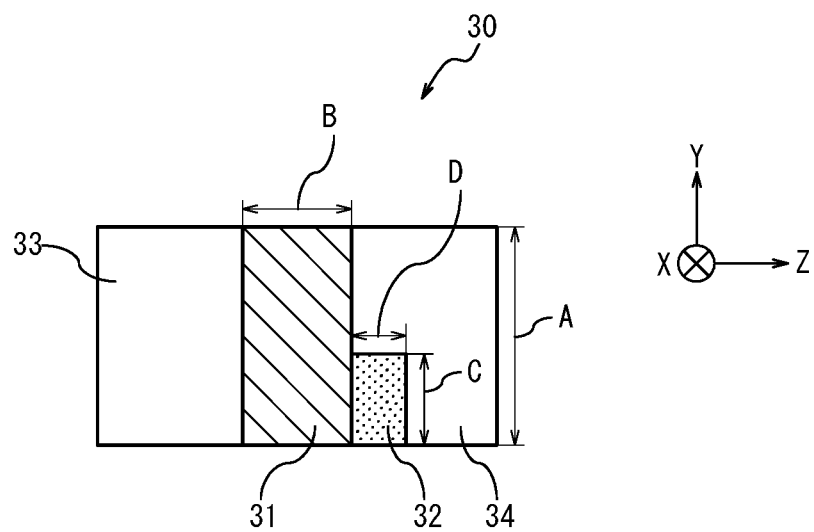
FIG. 5 is a cross-sectional view illustrating an example of the structure of the non-reciprocal member.

The second waveguide 30 may have a shape illustrated in FIG. 5, in a cross section intersecting the X axis. The dimension of the second waveguide 30 in the Y-axis direction and the dimension of the core 31 in the Y-axis direction are each denoted by A. The dimension of the core 31 in the Z-axis direction is denoted by B. The dimensions of the non-reciprocal member 32 in the Y-axis direction and the Z-axis direction are respectively denoted by C and D. The non-reciprocal member 32 is located further on the positive side of the Z axis than the core 31, and located on the negative side of the Y axis in the second waveguide 30. The second waveguide 30 extends in the X-axis direction so that its dimension in the X-axis direction is a predetermined length. The non-reciprocal member 32 has relative permittivity expressed by a complex relative permittivity tensor.

Figure 6:
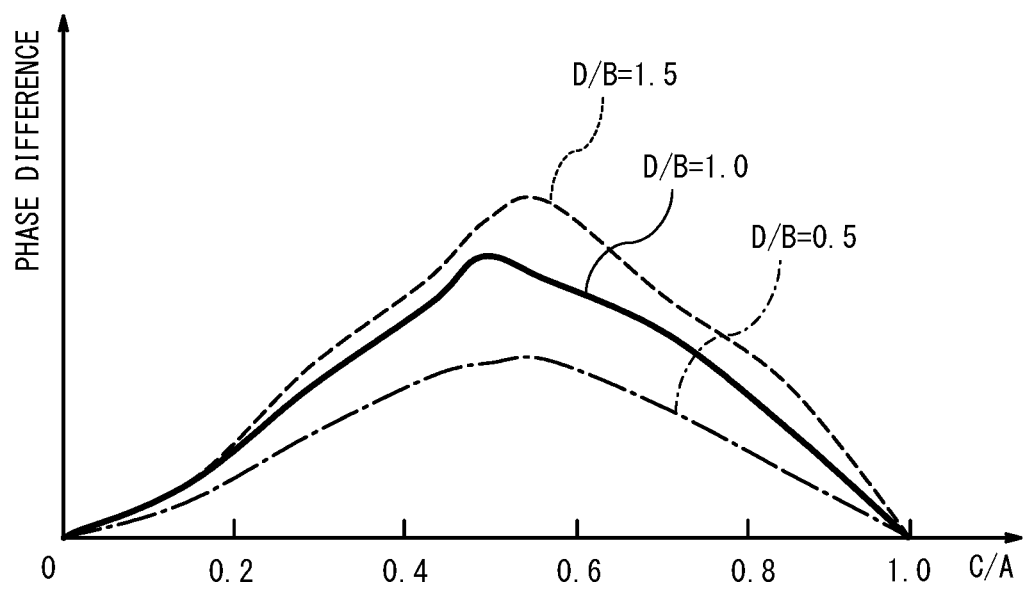
FIG. 6 is a graph illustrating an example of a phase difference in the non-reciprocal member in FIG. 5.

For the second waveguide 30 illustrated in FIG. 5, the difference between the phase of electromagnetic waves propagating in the first direction in the second waveguide 30 and the phase of electromagnetic waves propagating in the second direction in the second waveguide 30 can be calculated by simulation. As illustrated in a graph in FIG. 6, the phase difference can vary depending on the value of C/A. The relationship between the phase difference and the value of C/A can vary depending on the value of D/B. According to the graph in FIG. 6, the phase difference can increase when the value of C/A approaches 0.5. The phase difference can be adjusted by changing the value of C/A. According to the graph in FIG. 6, the phase difference can increase when the value of D/B increases. The phase difference can be adjusted by changing the value of D/B. The second waveguide 30 can be configured to have non-reciprocity by adjusting the value of C/A and the value of D/B. In the case where the value of D/B increases in the range illustrated in FIG. 6, the degree of symmetry of the asymmetrical core decreases. In other words, the non-reciprocity of the second waveguide 30 can be increased by decreasing the degree of symmetry of the asymmetrical core.

Figure 7:
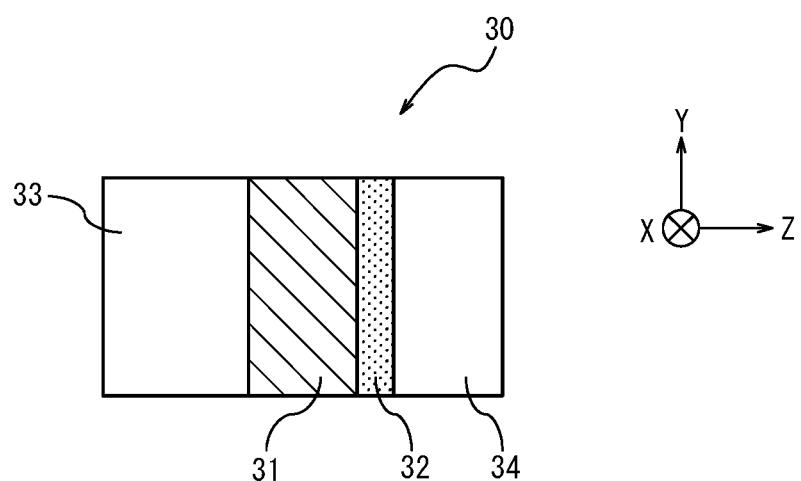
FIG. 7 is a cross-sectional view illustrating an example of the structure of the non-reciprocal member.

The second waveguide 30 may have a shape illustrated in FIG. 7, in a cross section intersecting the X axis. In this case, the asymmetrical core is not point-symmetric. Therefore, the second waveguide 30 illustrated in FIG. 7 can have non-reciprocity.

Figure 8:
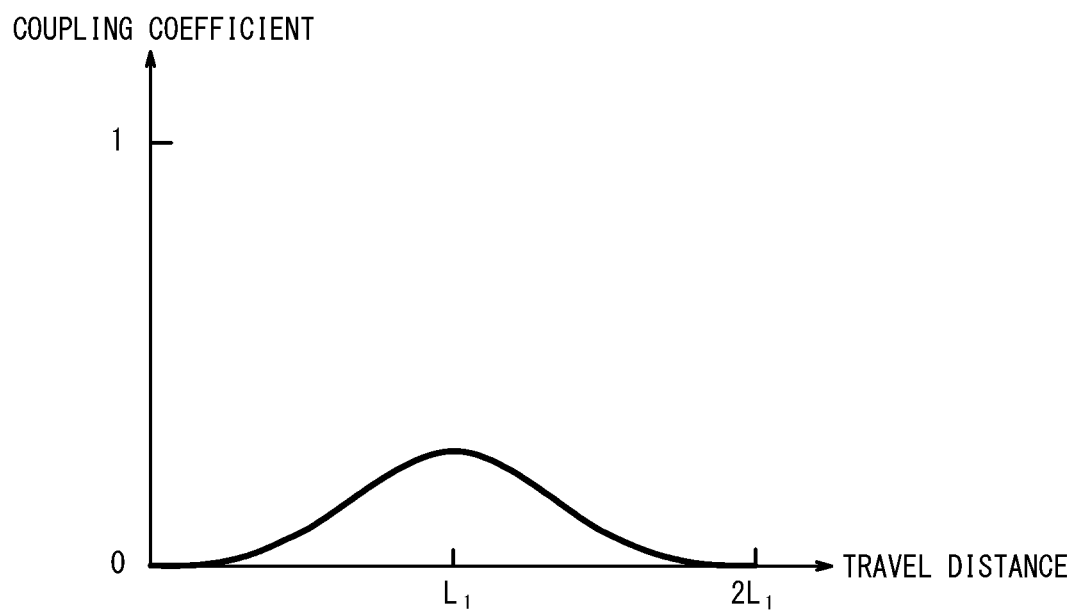
FIG. 8 is a graph illustrating an example of coupling length for electromagnetic waves traveling in a first direction.
Figure 9:
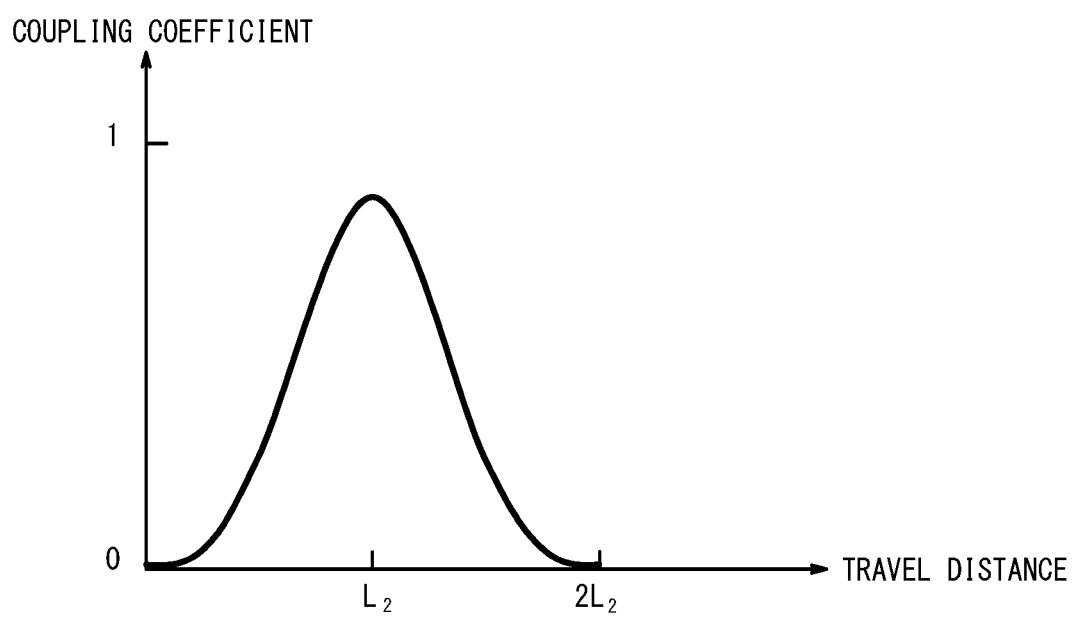
FIG. 9 is a graph illustrating an example of coupling length for electromagnetic waves traveling in a second direction.

In the case where one waveguide in the parallel waveguides has non-reciprocity, the local maximum value of the coupling coefficient in the case where electromagnetic waves propagate in the first direction and the local maximum value of the coupling coefficient in the case where electromagnetic waves propagate in the second direction can be different. For example, as illustrated in FIG. 8, the local maximum value of the coupling coefficient of the first waveguide 20 and the second waveguide 30 in the case where electromagnetic waves propagate in the first direction can be a value close to 0. For example, as illustrated in FIG. 9, the local maximum value of the coupling coefficient of the first waveguide 20 and the second waveguide 30 in the case where electromagnetic waves propagate in the second direction can be a value close to 1. As a result of the local maximum value of the coupling coefficient being different depending on the propagation direction of electromagnetic waves, the transmittance of electromagnetic waves can differ depending on the propagation direction of electromagnetic waves. In each of FIGS. 8 and 9, the horizontal axis and the vertical axis respectively represent the travel distance of electromagnetic waves in the parallel waveguides and the coupling coefficient.

In the case where the second waveguide 30 has non-reciprocity, the coupling coefficient of the first waveguide 20 and the second waveguide 30 can differ depending on the propagation direction of electromagnetic waves. That is, in the case where the second waveguide 30 has non-reciprocity, the first coupling coefficient of the isolator 10 can be different from the second coupling coefficient of the isolator 10. By adjusting the degree of non-reciprocity of the second waveguide 30, the second coupling coefficient can be set to be larger than the first coupling coefficient.

In the case where electromagnetic waves input into the first waveguide 20 from the first port 211 propagate in the first direction, at least part of electromagnetic waves that have moved into the second waveguide 30 from among the input electromagnetic waves can reach the end 302. The electromagnetic waves reaching the end 302 of the second waveguide 30 can be radiated from the end 302 to the outside or reflected by the end 302, without being output from the second port 212 of the first waveguide 20. In the case where the first coupling coefficient is large, the proportion of the electromagnetic waves moving into the second waveguide 30 and reaching the end 302 to the electromagnetic waves input into the first waveguide 20 can be high. In this case, the proportion of the electromagnetic waves output from the second port 212 to the electromagnetic waves input into the first waveguide 20 can be low. That is, the ratio of the intensity of electromagnetic waves output from the second port 212 to the intensity of electromagnetic waves input into the first port 211 can be low. The ratio of the intensity of electromagnetic waves output from the second port 212 to the intensity of electromagnetic waves input into the first port 211 is also referred to as the transmittance of the isolator 10 for electromagnetic waves propagating in the first direction. In the case where the first coupling coefficient is large, the transmittance for electromagnetic waves propagating in the first direction can be low. In the case where the first coupling coefficient is small, the transmittance for electromagnetic waves propagating in the first direction can be high, because the proportion of electromagnetic waves moving into the second waveguide 30 can be low.

Electromagnetic waves input into the first waveguide 20 from the second port 212 and propagating in the second direction can be subjected to the same action as the action of the isolator 10 exerted on electromagnetic waves propagating in the first direction. Through this action, part of the electromagnetic waves propagating in the second direction can reach the end 301 of the second waveguide 30. In the case where the second coupling coefficient is large, the transmittance for electromagnetic waves propagating in the second direction can be low. In the case where the second coupling coefficient is small, the transmittance for electromagnetic waves propagating in the second direction can be high.

In the case where the first coupling coefficient and the second coupling coefficient are different, the transmittance for electromagnetic waves propagating in the first direction and the transmittance for electromagnetic waves propagating in the second direction can be different. That is, the isolator 10 can function to facilitate propagation of electromagnetic waves in one direction and hinder propagation of electromagnetic waves in the opposite direction, by making the first coupling coefficient and the second coupling coefficient different from each other. In the case where the second coupling coefficient is larger than the first coupling coefficient, the isolator 10 can function to facilitate propagation of electromagnetic waves in the first direction and hinder propagation of electromagnetic waves in the second direction. In the case where the first coupling coefficient is approximately 0 and the second coupling coefficient is approximately 1, the difference between the transmittance for electromagnetic waves propagating in the first direction and the transmittance for electromagnetic waves propagating in the second direction can be large. This can improve the function of the isolator 10.

In the case where one waveguide in the parallel waveguides has non-reciprocity, the coupling length of the parallel waveguides with respect to electromagnetic waves propagating in the first direction and the coupling length of the parallel waveguides with respect to electromagnetic waves propagating in the second direction can be different. For example, as illustrated in FIG. 8, the coupling length with respect to electromagnetic waves propagating in the first direction in the isolator 10 can be denoted by $L_1$. For example, as illustrated in FIG. 9, the coupling length with respect to electromagnetic waves propagating in the second direction in the isolator 10 can be denoted by $L_2$. The isolator 10 may be configured so that $L_1$ and $L_2$ are different.

In the case where the length for which the two waveguides extend along each other is equal to the coupling length in the parallel waveguides, the coupling coefficient can be the local maximum value. For example, in the case where the length for which the two waveguides extend along each other is $L_1$ in the parallel waveguides having the relationship illustrated in the graph in FIG. 8, the coupling coefficient can be the local maximum value. In the case where the length for which the two waveguides extend along each other is equal to twice the coupling length, the coupling coefficient can be the local minimum value. For example, in the case where the length for which the two waveguides extend along each other is $2L_1$ in the parallel waveguides having the relationship illustrated in FIG. 8, the coupling coefficient can be the local minimum value.

The relationship illustrated in the graph in FIG. 8 can be repeated in a region in which the travel distance of electromagnetic waves is longer. That is, in the case where the length for which the two waveguides extend along each other is an odd multiple of $L_1$, the coupling coefficient can be the local maximum value. In the case where the length for which the two waveguides extend along each other is an even multiple of $L_1$, the coupling coefficient can be the local minimum value. In the parallel waveguides having the relationship illustrated in FIG. 9, too, the coupling coefficient can be the local maximum value in the case where the length for which the two waveguides extend along each other is an odd multiple of of $L_2$, and the local minimum value in the case where the length for which the two waveguides extend along each other is an even multiple of $L_2$. $L_1$ and $L_2$ are each a length that can be the shortest coupling length in the parallel waveguides, and are also referred to as a unit coupling length. Thus, the coupling length may be an odd multiple of the unit coupling length.

The first coupling coefficient and the second coupling coefficient can be adjusted by adjusting the length for which the first waveguide 20 and the second waveguide 30 extend along each other. The length for which the first waveguide 20 and the second waveguide 30 extend along each other may be approximately the same as an odd multiple of the unit coupling length with respect to electromagnetic waves propagating in the second direction. The second coupling coefficient can thus be increased. The length for which the first waveguide 20 and the second waveguide 30 extend along each other may be approximately the same as an even multiple of the unit coupling length with respect to electromagnetic waves propagating in the first direction. The first coupling coefficient can thus be decreased. In this way, the second coupling coefficient may be set to be larger than the first coupling coefficient.

Figure 10:
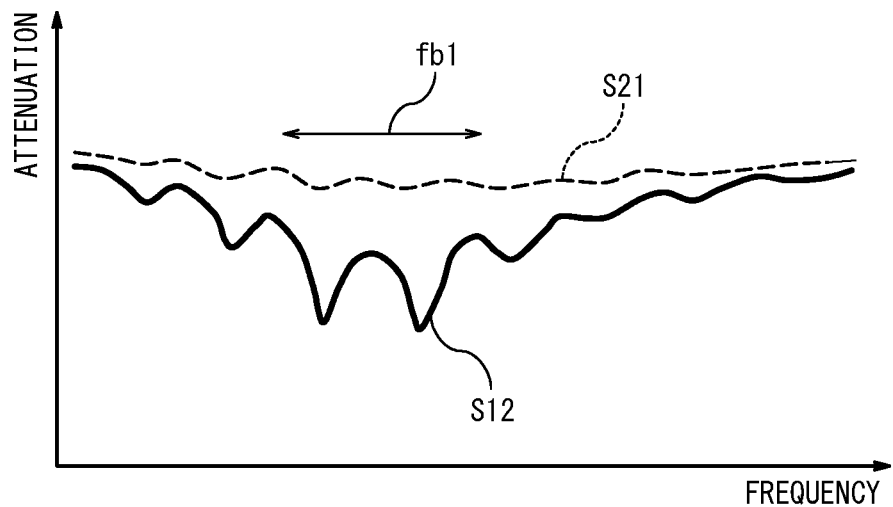
FIG. 10 is a graph illustrating an example of a simulation result of transmission characteristics.

The amount of electromagnetic waves not output from the other port of the isolator 10 among electromagnetic waves input into one port of the isolator 10 is also referred to as attenuation. In the case where the attenuation of electromagnetic waves is large, the transmittance of the electromagnetic waves is low. The attenuation of electromagnetic waves traveling in the first direction and the attenuation of electromagnetic waves traveling in the second direction in the isolator 10 can be calculated by simulation using a finite element method or the like. In FIG. 10, the relationship between the attenuation of electromagnetic waves propagating in the second direction and the frequency of the electromagnetic waves is represented by a solid line graph denoted by S12. The relationship between the attenuation of electromagnetic waves propagating in the first direction and the frequency of the electromagnetic waves is represented by a dashed line graph denoted by S21. The horizontal axis and the vertical axis of the graph respectively represent the frequency of electromagnetic waves propagating in the first waveguide 20 and the attenuation of the electromagnetic waves. The attenuation of electromagnetic waves is expressed in decibels (dB). A plot located higher in the vertical axis indicates that the attenuation of electromagnetic waves is small. A plot located lower in the vertical axis indicates that the attenuation of electromagnetic waves is large.

As illustrated in FIG. 10, the attenuation of electromagnetic waves propagating in the second direction can be larger than the attenuation of electromagnetic waves propagating in the first direction in a predetermined frequency band denoted by fb1. In this case, the isolator 10 can function to facilitate propagation of electromagnetic waves in the predetermined frequency band from the first port 211 to the second port 212, and hinder propagation of the electromagnetic waves from the second port 212 to the first port 211. The predetermined frequency band for which the isolator 10 can function to make the attenuation different depending on the propagation direction of electromagnetic waves is also referred to as the operation frequency of the isolator 10. Any operation frequency of the isolator 10 can be determined based on the structure of the isolator 10. That is, the second coupling coefficient can be set to be larger than the first coupling coefficient in any operation frequency.

The isolator 10 according to this embodiment has a function of causing the transmittance for electromagnetic waves propagating in the first direction and the transmittance for electromagnetic waves propagating in the second direction to be different. Such a function can also be achieved by an isolator 90 according to a comparative example illustrated in FIG. 11.

The isolator 90 includes an input end 91, a brancher/coupler 92, a reciprocal phase shifter 93, a non-reciprocal phase shifter 94, a brancher/coupler 95, and an output end 96. Electromagnetic waves input from the input end 91 are branched in the brancher/coupler 92, and propagate to the reciprocal phase shifter 93 and the non-reciprocal phase shifter 94.

The electromagnetic waves are phase-shifted in each of the reciprocal phase shifter 93 and the non-reciprocal phase shifter 94, are coupled in the brancher/coupler 95, and propagate to the output end 96. The reciprocal phase shifter 93 and the non-reciprocal phase shifter 94 can be configured so that electromagnetic waves input from the input end 91 are output from the output end 96. On the other hand, electromagnetic waves input from the output end 96 are branched in the brancher/coupler 95, and propagate to the reciprocal phase shifter 93 and the non-reciprocal phase shifter 94. The electromagnetic waves are phase-shifted in each of the reciprocal phase shifter 93 and the non-reciprocal phase shifter 94, are coupled in the brancher/coupler 92, and propagate to the input end 91. The reciprocal phase shifter 93 and the non-reciprocal phase shifter 94 can be configured so that electromagnetic waves input from the output end 96 are not output from the input end 91.

In the isolator 90 according to the comparative example, the loss of electromagnetic waves in the non-reciprocal phase shifter 94 and the brancher/couplers 92 and 95 is relatively high In the isolator 10 according to this embodiment, on the other hand, electromagnetic waves basically propagate in the core 31. Consequently, the loss of electromagnetic waves in the isolator 10 according to this embodiment can be less than the loss of electromagnetic waves in the isolator 90 according to the comparative example. That is, the isolator 10 according to this embodiment can function to facilitate transmission of electromagnetic waves in one direction and hinder transmission of electromagnetic waves in the opposite direction while reducing the loss of electromagnetic waves. In the isolator 10 according to this embodiment, the first waveguide 20 and the second waveguide 30 are also respectively referred to as a reciprocal line and a non-reciprocal line.

In the isolator 90 according to the comparative example, the non-reciprocal phase shifter 94 and the brancher/couplers 92 and 95 are connected in series, which makes size reduction difficult. In the isolator 10 according to this embodiment, the first waveguide 20 and the second waveguide 30 overlap each other, so that the isolator 10 can be easily reduced in size on the substrate 50. Consequently, the isolator 10 according to this embodiment can be integrated and mounted on the substrate 50. That is, the isolator 10 according to this embodiment can function to facilitate transmission of electromagnetic waves in one direction and hinder transmission of electromagnetic waves in the opposite direction, by its integrated structure.

Figure 12:
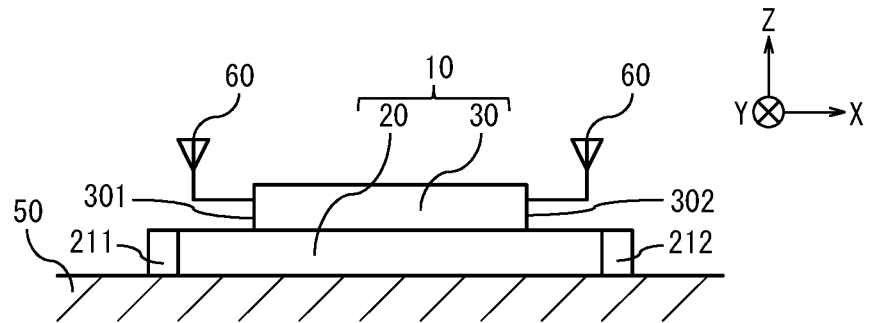
FIG. 12 is a side view illustrating an example of including antennas at both ends of a second waveguide.

As illustrated in FIG. 12, the isolator 10 may further include an antenna 60 for radiating electromagnetic waves, at each of the ends 301 and 302 of the second waveguide 30. The antennas 60 can efficiently radiate electromagnetic waves reaching the ends 301 and 302. The antennas 60 suppress reflection of electromagnetic waves at the ends 301 and 302. This can improve the function of the isolator 10.

The second waveguide 30 may have a cut surface at each of the ends 301 and 302. The cut surfaces at both ends of the second waveguide 30 may function as antennas 60. A normal vector of the cut surface at each of the ends 301 and 302 of the second waveguide 30 may be in a direction having an inclination with respect to the X axis. The angle between the direction of the normal vector of the cut surface and the X-axis direction may be greater than 0 degrees. In other words, the normal vector of the cut surface may have a component in a direction intersecting the propagation direction of electromagnetic waves in the second waveguide 30. The angle between the direction of the normal vector of the cut surface and the X-axis direction may be close to 90 degrees. In the case where the angle between the direction of the normal vector of the cut surface and the X axis is close to 90 degrees, the second waveguide 30 has a tapered shape of gradually decreasing in thickness at each of the ends 301 and 302. Consequently, the reflectance of electromagnetic waves at the ends 301 and 302 can be reduced. In the case where the second waveguide 30 is located above the first waveguide 20 as viewed from the substrate 50, the cut surfaces at both ends of the second waveguide 30 can be easily formed by processing on the substrate 50.

Figure 13:
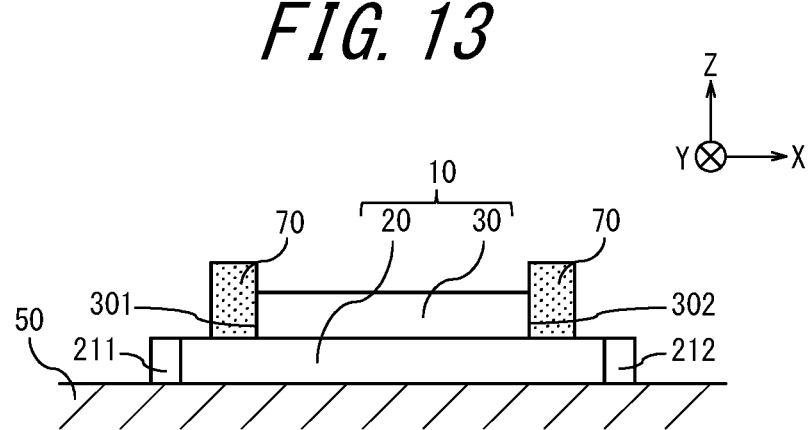
FIG. 13 is a side view illustrating an example of including electromagnetic wave absorbing members at both ends of the second waveguide.

As illustrated in FIG. 13, the isolator 10 may further include an electromagnetic wave absorbing member 70 on the outer side of each of the ends 301 and 302 of the second waveguide 30. The electromagnetic wave absorbing members 70 can absorb electromagnetic waves radiated from the ends 301 and 302. This prevents electromagnetic waves radiated from the isolator 10 from affecting other circuits located around the isolator 10.

Figure 14:
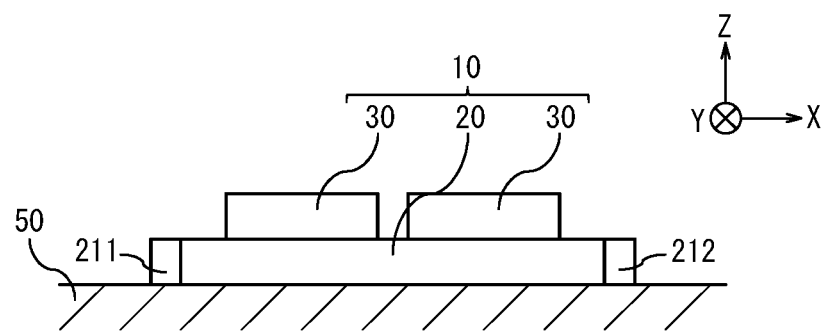
FIG. 14 is a side view illustrating an example of including a plurality of second waveguides.

As illustrated in FIG. 14, the isolator 10 may have a plurality of second waveguides 30. The number of second waveguides 30 is not limited to two, and may be three or more. Each second waveguide 30 may be coupled to the first waveguide 20 in series. The length for which each second waveguide 30 and the first waveguide 20 extend along each other may be approximately the same as the coupling length with respect to electromagnetic waves propagating in the second direction. As a result of the isolator 10 including the plurality of second waveguides 30, electromagnetic waves propagating in the second direction are more likely to be radiated from the second waveguide 30, and less likely to reach the first end 201 from the second end 202. This can improve the function of the isolator 10, i.e. the function of facilitating propagation of electromagnetic waves in one direction and hindering propagation of electromagnetic waves in the opposite direction.

Figure 15:
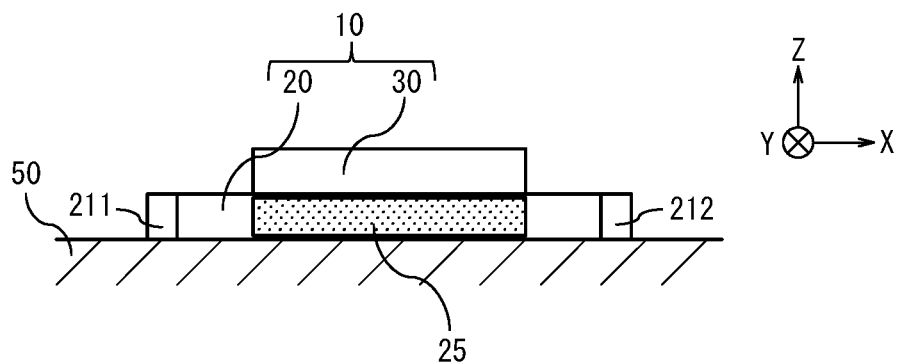
FIG. 15 is a side view illustrating an example of the structure of the isolator including a matching circuit in a waveguide.
Figure 16:
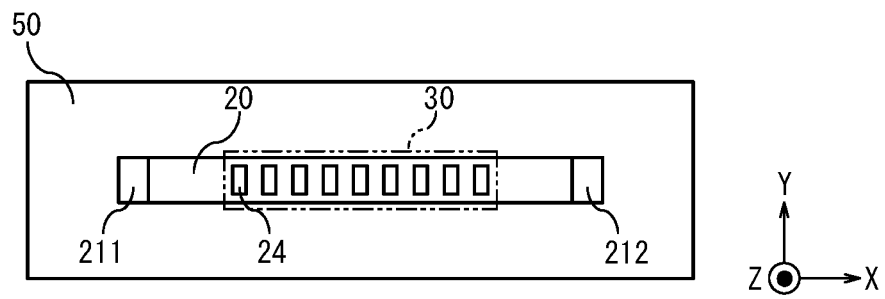
FIG. 16 is a plan view illustrating an example of the structure of the matching circuit.

As illustrated in FIG. 15, the first waveguide 20 may include a matching adjustment circuit 25. The matching adjustment circuit 25 can adjust propagation characteristics for each frequency of electromagnetic waves propagating in the first waveguide 20. For example, the matching adjustment circuit 25 may be provided as a structure in which the core 21 has a plurality of holes 24, as illustrated in FIG. 16. In FIG. 16, the second waveguide 30 is indicated by a dashed-two dotted imaginary line. The holes 24 may be formed through the core 21 in the Y-axis direction. The holes 24 may be formed through the core 21 from the first surface 21a to the second surface 21b. The holes 24 may be formed through the clads 22 and 23 in the Y-axis direction. The holes 24 may be arranged in the X-axis direction. That is, the holes 24 may be arranged in a direction in which the core 21 extends. The number of holes 24 is not limited to nine. The shape of each hole 24 as viewed in the Z-axis direction is not limited to a rectangular shape, and may be any of various shapes such as circular and polygonal.

The holes 24 may be arranged in the X-axis direction at regular intervals. In the case where the core 21 has holes 24 arranged in the X-axis direction at regular intervals, the first waveguide 20 including the core 21 can form a Bragg diffraction grating. In the case where electromagnetic waves are input into the first waveguide 20 from the first port 211, electromagnetic waves whose wavelengths satisfy a Bragg reflection condition among the input electromagnetic waves can be reflected to return to the first port 211. Meanwhile, electromagnetic waves having other wavelengths can propagate toward the second port 212. Thus, the first waveguide 20 having the holes 24 can function as a filter for electromagnetic waves having predetermined wavelengths.

Figure 17:
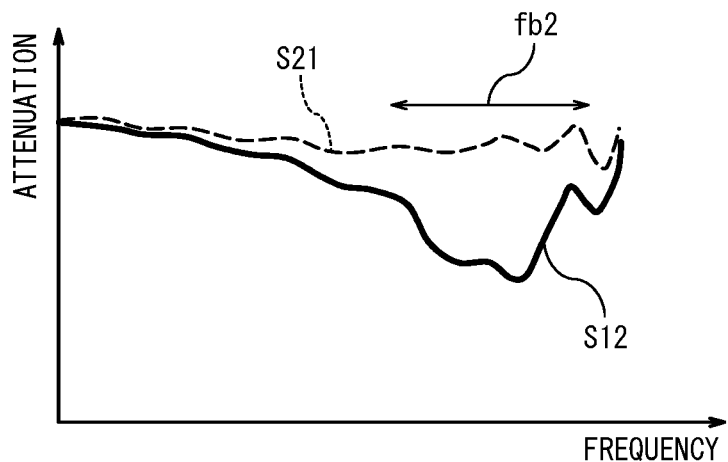
FIG. 17 is a graph illustrating an example of a simulation result of transmission characteristics.

In the case where the first waveguide 20 includes the matching adjustment circuit 25, for example as illustrated in FIG. 17, the attenuation of electromagnetic waves propagating in the first direction can be larger than the attenuation of electromagnetic waves propagating in the second direction in a predetermined frequency band denoted by fb2. The frequency band denoted by fb2 may be different from the frequency band denoted by fb1 in FIG. 10. By adjusting the structure of the matching adjustment circuit 25, the frequency band denoted by fb2 can be set to be higher than the frequency band denoted by fb1 or lower than the frequency band denoted by fb1. Description of parts of the graph in FIG. 17 in common with those of the graph in FIG. 10 is omitted.

The non-reciprocal member 32 may be configured to have non-reciprocity in the case where a magnetic field in a predetermined direction is applied. The non-reciprocal member 32 may be configured to have non-reciprocity in the case where a magnetic field having a component in the Z-axis direction is applied. The predetermined direction is not limited to the Z-axis direction, and may be any of various directions. The predetermined direction may be determined based on the cross-sectional shape or the degree of symmetry of the asymmetrical core. The non-reciprocal member 32 may be configured to have non-reciprocity that differs in degree according to a change in magnetic field intensity or direction. With such a structure of the isolator 10, whether the non-reciprocal member 32 has non-reciprocity or the degree of non-reciprocity of the non-reciprocal member 32 can be controlled.

Figure 18:
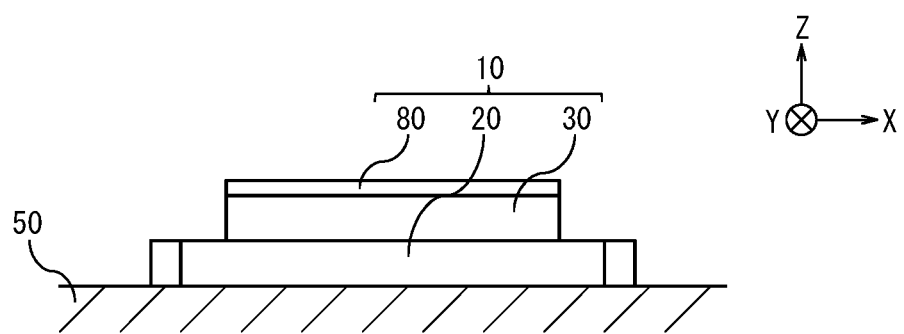
FIG. 18 is a side view illustrating an example of the structure of the isolator further including a magnetic field applying portion.

As illustrated in FIG. 18, the isolator 10 may further include a magnetic field applying portion 80 for applying a magnetic field. The magnetic field applying portion 80 may be located on the positive side of the Z axis with respect to the second waveguide 30. The magnetic field applying portion 80 may be located on the substrate 50 side with respect to the second waveguide 30, with the first waveguide 20 being interposed therebetween. The magnetic field applying portion 80 may be located in a different form from the form illustrated in FIG. 18. The magnetic field applying portion 80 may be a permanent magnet such as a ferrite magnet or a neodymium magnet. The magnetic field applying portion 80 may be an electromagnet.

Propagation modes of electromagnetic waves in the parallel waveguides can include an even mode and an odd mode. The even mode is a mode in which the electric fields of propagating electromagnetic waves are in the same direction in the waveguides constituting the parallel waveguides. The odd mode is a mode in which the electric fields of propagating electromagnetic waves are in the opposite directions in the waveguides constituting the parallel waveguides. Electromagnetic waves can propagate in the parallel waveguides based on the effective refractive index of the parallel waveguides. The effective refractive index of the parallel waveguides can be determined based on the shapes of the waveguides constituting the parallel waveguides, the relative permittivity of the material of each waveguide, the propagation mode of electromagnetic waves, or the like. The effective refractive index of the parallel waveguides in the case where electromagnetic waves propagate in the even mode is also referred to as an even mode refractive index. The effective refractive index of the parallel waveguides in the case where electromagnetic waves propagate in the odd mode is also referred to as an odd mode refractive index. The even mode refractive index and the odd mode refractive index are respectively denoted by $n_{even}$ and $n_{odd}$. The coupling length in the parallel waveguides can be expressed by the following Formula (2):

$$L = \frac{m\lambda_0}{2 \cdot |n_{even} - n_{odd}|} \quad (2)$$

(L: coupling length, m: odd number, $\lambda_0$: wavelength in a vacuum).

Figure 19:
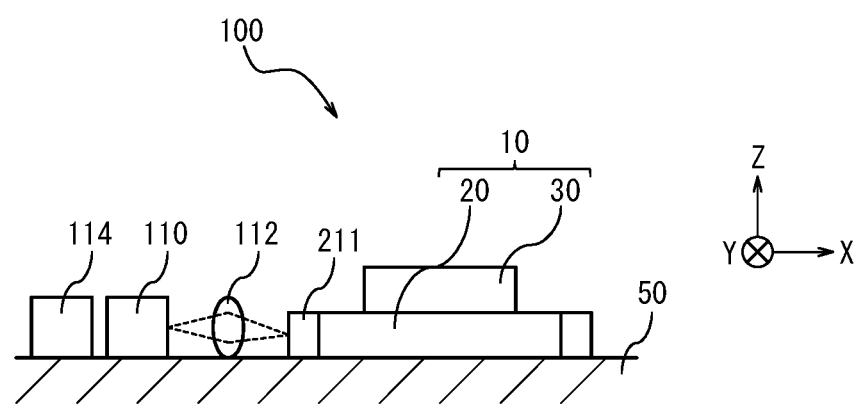
FIG. 19 is a side view illustrating an example of the structure of a light source device according to an embodiment.

The isolator 10 can be used in combination with a structure for inputting light. Such an isolator 10 is also referred to as an optical isolator. As illustrated in FIG. 19, a light source device 100 includes the isolator 10, a light source 110, a lens 112, and a power source 114 for supplying power to the light source 110. The light source 110 may be, for example, a semiconductor laser such as a laser diode (LD) or a vertical cavity surface emitting laser (VCSEL). The light source 110 may be formed on the substrate 50.

The lens 112 condenses light output from the light source 110, to the first port 211 of the first waveguide 20 of the isolator 10. The shape of the lens 112 is not limited. Examples of the lens 112 that can be used include a small-sphere lens, a biconvex lens, and a planoconvex lens. The lens 112 may contain a material having optical transparency for wavelengths of light propagated.

The light source 110 is optically connected to the first port 211 via the lens 112. The positional relationships among the light source 110, the lens 112, and the first port 211 may be fixed to prevent displacement. The light source 110, the lens 112, and the first port 211 may be integrated on the substrate 50 as a single unit. The light source 110 may input linearly polarized light whose polarization direction is the Y-axis direction, to the first port 211. The light source device 100 may not include the lens 112. In the case where the light source device 100 does not include the lens 112, light emitted from the light source 110 may be directly input into the first port 211.

The method of inputting light from the light source 110 to the first port 211 is not limited to a method whereby light from the light source 110 is input into the first port 211 directly or via the lens 112. The light source 110 may be coupled to the first port 211 via optical fibers. The method of inputting light propagating through the optical fibers to the first port 211 may be any of various methods such as a method of connecting through free space using a lens or the like, a method of directly butting the emission surfaces of the optical fibers and the first port 211 together, and a method of using a connecting waveguide 120 (see FIG. 20).

With the inclusion of the light source 110 and the isolator 10, the light source device 100 can output light emitted from the light source 110 in the first direction through the isolator 10. The light source device 100 can also hinder propagation of light returning in the second direction by the isolator 10, thus hindering return of light toward the light source 110. Consequently, light can be output efficiently.

In the light source device 100, the first waveguide 20 may be in contact with the substrate surface 50a. That is, the first waveguide 20 may be closer to the substrate surface 50a than the second waveguide 30. Thus, the light source 110 and the first port 211 integrated on the substrate 50 can be optically connected easily.

Figure 20:
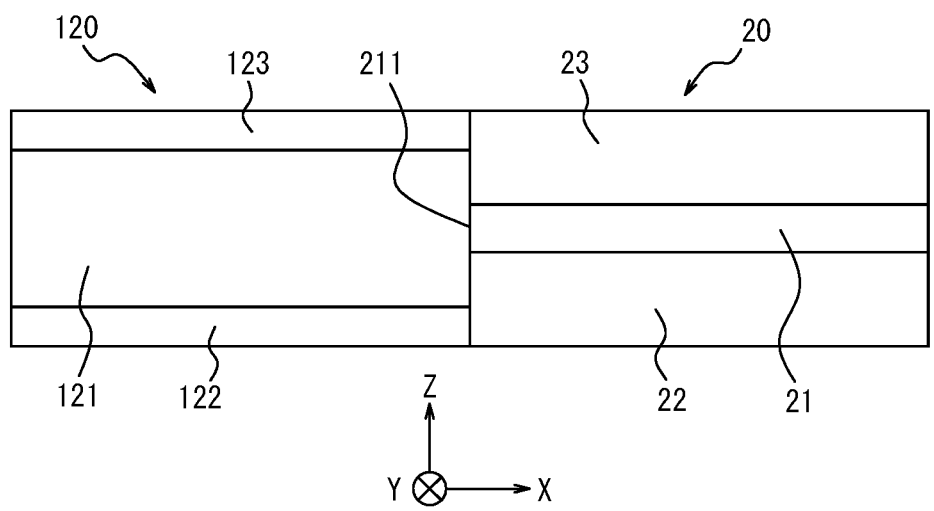
FIG. 20 is a cross-sectional view illustrating an example of connection between a connecting waveguide and a first waveguide.

As illustrated in FIG. 20, the connecting waveguide 120 may include a core 121 and clads 122 and 123. The relative permittivity of the core 121 may be approximately the same as the relative permittivity of the core 21 of the first waveguide 20. The core 121 may be made of the same material as the core 21. The relative permittivity of the clads 122 and 123 may be lower than the relative permittivity of the core 121. The relative permittivity of the clads 122 and 123 may be approximately the same as the relative permittivity of the clads 22 and 23 of the first waveguide 20. The clads 122 and 123 may be made of the same material as the clads 22 and 23. The end surface of the core 121 on the positive side of the X axis is in contact with the first port 211 located at the end surface of the core 21 on the negative side of the X axis. The thickness of the core 121 in the Z-axis direction may be thicker than the thickness of the core 21 of the first waveguide 20 in the Z-axis direction. The thickness of the core 121 in the Z-axis direction may be approximately the same as the thickness of the core 21 of the first waveguide 20 in the Z-axis direction.

Light input into the core 121 from the negative side of the X axis may be linearly polarized light whose polarization direction is the Y-axis direction. In other words, the polarization direction of light input into the core 121 from the negative side of the X axis may be parallel to the substrate surface 50a. In the case where the light source 110 integrated on the substrate 50 is a semiconductor laser, the polarization direction of light emitted from the semiconductor laser is parallel to the substrate surface 50a. The semiconductor laser is easily integrated on the substrate 50. This eases the formation of the light source device 100.

At the junction of the core 121 and the core 21, the width of the core 121 in the Y-axis direction may be approximately the same as the width of the core 21 in the Y-axis direction. In the case where the widths of the core 121 and the core 21 in the Y-axis direction vary discontinuously at the junction of the core 121 and the core 21, light whose polarization direction is the Y-axis direction tends to be radiated at the junction. As a result of the widths of the core 121 and the core 21 in the Y-axis direction being approximately the same at the junction of the core 121 and the core 21, loss caused by radiation can be reduced.

Figure 21:
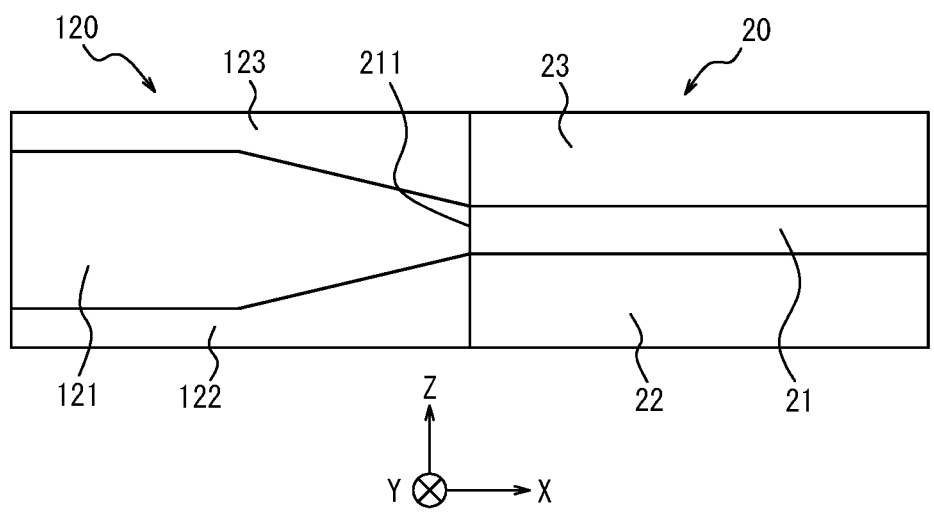
FIG. 21 is a cross-sectional view illustrating an example of connection between the connecting waveguide and the first waveguide.

As illustrated in FIG. 21, the core 121 of the connecting waveguide 120 may have a tapered shape of decreasing in thickness in the Z-axis direction as it approaches the junction with the core 21 of the first waveguide 20. Thus, in the case where light whose polarization direction is the Y-axis direction is input into the connecting waveguide 120, the input light can be matched to the light propagation mode in the core 21. When light enters the core 21 from the core 121, a mismatch in light propagation mode is suppressed. This can reduce loss when light enters the core 21 from the core 121.

Figure 22:
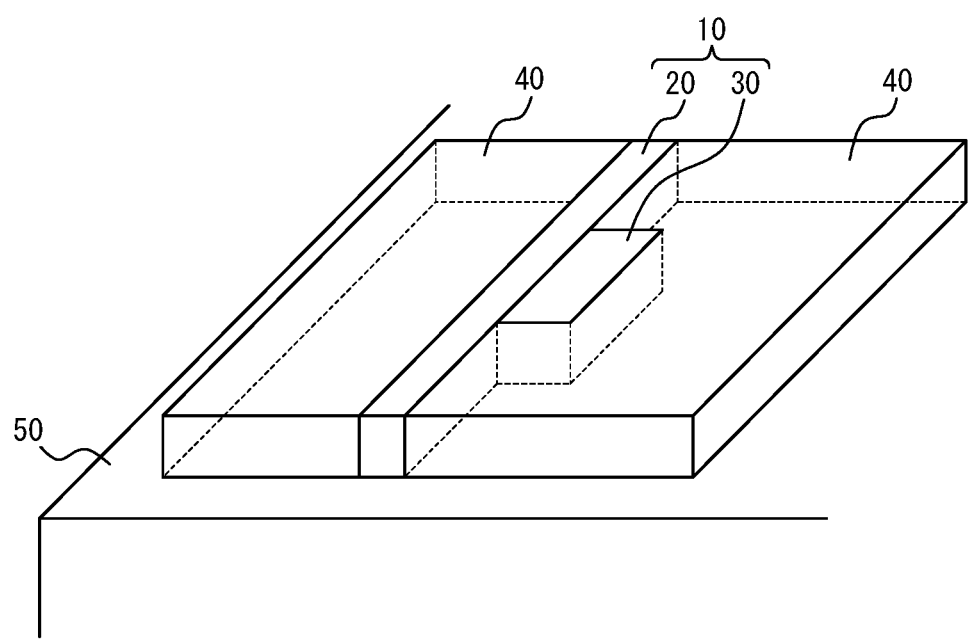
FIG. 22 is a perspective view illustrating an example of the structure of an isolator according to another embodiment.
Figure 22:
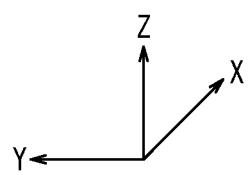

As illustrated in FIG. 22, an isolator 10 according to another embodiment includes a first waveguide 20 and a second waveguide 30 that are arranged on the substrate 50 side by side along the substrate surface 50a (see FIG. 1, etc.). The isolator 10 may further include a clad 40 located around the first waveguide 20 and the second waveguide 30.

Figure 23:
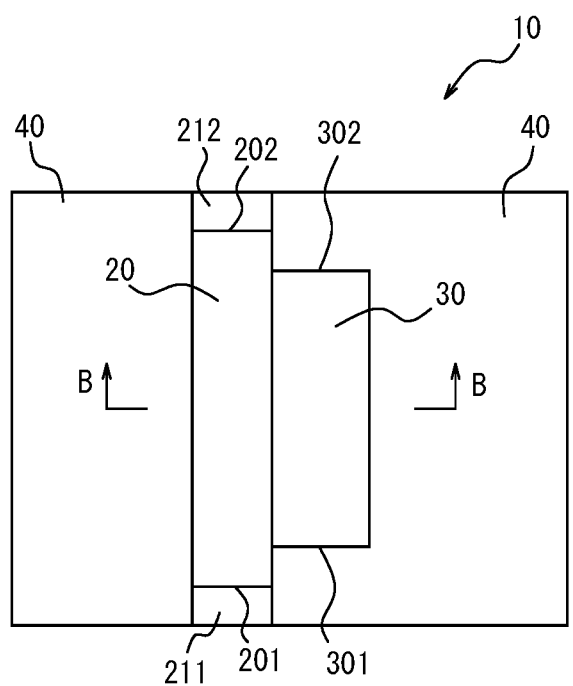
FIG. 23 is a plan view illustrating an example of the structure of the isolator according to the other embodiment.
Figure 23:
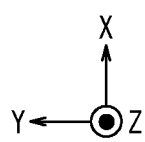

As illustrated in FIG. 23, the first waveguide 20 has a first end 201 and a second end 202 respectively on the positive side and the negative side of the X axis. The first waveguide 20 has a first port 211 and a second port 212 through which electromagnetic waves are input and output, respectively at the first end 201 and the second end 202. Electromagnetic waves input into the first waveguide 20 from the first port 211 travel toward the second port 212 along the X axis. Electromagnetic waves input into the first waveguide 20 from the second port 212 travel toward the first port 211 along the X axis. The first port 211 and the second port 212 may each be configured as an end surface of a core 21 (see FIG. 24), or as a coupler connected to an external device and capable of propagating electromagnetic waves.

The second waveguide 30 has ends 301 and 302 respectively on the positive side and the negative side of the X axis. In other words, the second waveguide 30 has both ends. The second waveguide 30 is located along the first waveguide 20, and coupled to the first waveguide 20. The number of second waveguides 30 is not limited to one, and may be two or more.

The first waveguide 20 and the second waveguide 30 may be located along each other, in at least one part in the direction in which they extend. The first waveguide 20 and the second waveguide 30 may be located parallel to each other, in at least one part in the direction in which they extend. The first waveguide 20 or the second waveguide 30 may have a linear structure. The first waveguide 20 and the second waveguide 30 having such simple structures can be easily formed on the substrate 50.

Electromagnetic waves which have moved from the first waveguide 20 into the second waveguide 30 propagate in the second waveguide 30 in the same direction as in the first waveguide 20. In the case where electromagnetic waves reach the end 301 or 302 in the second waveguide 30, the electromagnetic waves can be emitted from the end 301 or 302, or reflected by the end 301 or 302 and travel in the opposite direction.

Figure 24:
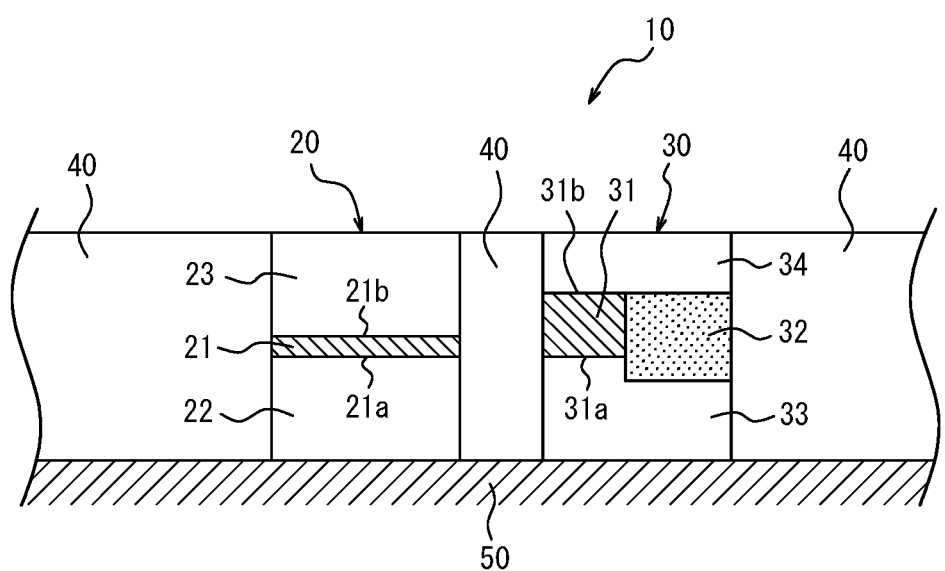
FIG. 24 is a cross-sectional view along B-B in FIG. 23.
Figure 24:
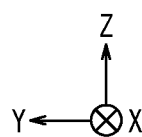

As illustrated in FIG. 24, the first waveguide 20 includes the core 21 and clads 22 and 23. The core 21 and the clads 22 and 23 extend in the X-axis direction. The clads 22 and 23 are located respectively on the negative side and the positive side of the Z axis with respect to the core 21. The clad 22 is located on the substrate 50 side as viewed from the core 21. The clad 23 is located on the side opposite to the substrate 50 as viewed from the core 21. The clad 22, the core 21, and the clad 23 are stacked in order as viewed from the substrate 50. The core 21 may have a first surface 21a on the substrate 50 side, and a second surface 21b on the side opposite to the first surface 21a. The clads 22 and 23 may be respectively in contact with the first surface 21a and the second surface 21b.

The second waveguide 30 includes the core 31, a non-reciprocal member 32, and clads 33 and 34. The core 31, the non-reciprocal member 32, and the clads 33 and 34 extend in the X-axis direction. Two or more non-reciprocal members 32 may be arranged side by side in the positive direction or the negative direction of the Y axis on either side of the core 31. In other words, the core 31 and the non-reciprocal member 32 may be located side by side on a plane of the substrate surface. The non-reciprocal member 32 may be located on the positive side or the negative side of the Z axis with respect to the core 31.

As illustrated in FIG. 24, the shapes of the core 31 and the non-reciprocal member 32 as viewed from a cross section intersecting the X axis are not point-symmetric. The shapes of the core 31 and the non-reciprocal member 32 may also be not line-symmetric. The core 31 and the non-reciprocal member 32 are also collectively referred to as an asymmetrical core. The asymmetrical core includes the core 31 and the non-reciprocal member 32. The asymmetrical core may have the non-reciprocal member 32 in at least one part of the cross section intersecting the X axis. The core 31 may contain at least one type of dielectric. The non-reciprocal member 32 may be in contact with the surface of the at least one type of dielectric on the substrate 50 side, or the surface of the at least one type of dielectric on the opposite side.

As illustrated in FIG. 24, the first waveguide 20 may include the core 21 as a first dielectric, and the clad 40 as a second dielectric. The second dielectric may be a different type of dielectric from the first dielectric. The first dielectric and the second dielectric may be arranged in a direction parallel to the substrate surface 50a. The second waveguide 30 may include the core 31 as a third dielectric, and the clad 40 as a fourth dielectric. The fourth dielectric may be a different type of dielectric from the third dielectric. The third dielectric, the fourth dielectric, and the non-reciprocal member 32 may be arranged in a direction parallel to the substrate surface 50a. The third dielectric, the fourth dielectric, and the non-reciprocal member 32 may be in contact in an in-plane direction of the substrate surface 50a. At least one of the clads 22 and 23 of the first waveguide 20 may be formed integrally with at least one of the clads 33 and 34 of the second waveguide 30. At least one of the clads 22 and 23 of the first waveguide 20 may be formed integrally with the clad 40. At least one of the clads 33 and 34 of the second waveguide 30 may be formed integrally with the clad 40.

Figure 11:
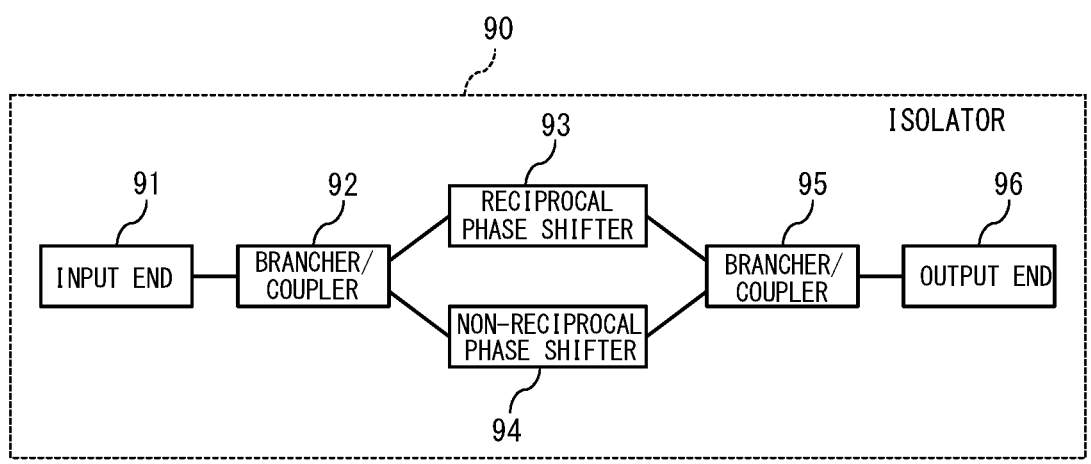
FIG. 11 is a block diagram illustrating an isolator according to a comparative example.

Even in the case where the first waveguide 20 and the second waveguide 30 are arranged side by side along the substrate surface 50a, the isolator 10 can be reduced in size as compared with the isolator 90 according to the comparative example illustrated in FIG. 11. The reason why the isolator 10 can be reduced in size is that the brancher/coupler 92 is unnecessary.

In this embodiment, as illustrated in FIG. 25, the attenuation of electromagnetic waves propagating in the first direction can be larger than the attenuation of electromagnetic waves propagating in the second direction in a predetermined frequency band denoted by fb3. The frequency band denoted by fb3 may be different from the frequency band denoted by fb1 in FIG. 10 or the frequency band denoted by fb2 in FIG. 17. Description of parts of the graph in FIG. 25 in common with those of the graphs in FIGS. 10 and 17 is omitted.

In FIG. 22, even in the case where each end of the second waveguide 30 is surrounded by the clad 40, electromagnetic waves propagating in the second waveguide 30 can be radiated from the end of the second waveguide 30 to the clad 40.

The isolator 10 and the light source device 100 according to the present disclosure may be included in an optical transmitter having a modulation function. The isolator 10 according to the present disclosure may be used in an optical switch or an optical amplifier. The isolator 10 according to the present disclosure may be used in a device. The device including the isolator 10 according to the present disclosure may be used for communication in a data center.

Although the embodiments according to the present disclosure have been described by way of the drawings and examples, various changes or modifications may be easily made by those of ordinary skill in the art based on the present disclosure. Such various changes or modifications are therefore included in the scope of the present disclosure. For example, the functions included in the components, steps, etc. may be rearranged without logical inconsistency, and a plurality of components, steps, etc. may be combined into one component, step, etc. and a component, step, etc. may be divided into a plurality of components, steps, etc. Although apparatuses have been mainly described in the embodiments according to the present disclosure, the embodiments according to the present disclosure can also be implemented as methods including the steps executed by the components included in the apparatuses. The embodiments according to the present disclosure can also be implemented as methods or programs executed by processors included in the apparatuses or storage media storing such programs, which are also included in the scope of the present disclosure.

Terms such as "first" and "second" in the present disclosure are identifiers for distinguishing components. Components distinguished by terms such as "first" and "second" in the present disclosure may have their numbers interchanged with each other. For example, the identifier "first" of the "first port" and the identifier "second" of the "second port" may be interchanged with each other. The identifiers are replaced with each other simultaneously. The components are distinguishable even after their identifiers are interchanged. The identifiers may be omitted. Components from which identifiers are omitted are distinguished by reference signs. Description of identifiers such as "first" and "second" in the present disclosure alone should not be used for interpretation of order of components or reasoning based on one identifier being smaller than another identifier.

The X axis, the Y axis, and the Z axis in the present disclosure are provided for the purpose of illustration, and may be replaced with one another. Components in the present disclosure have been described using an orthogonal coordinate system formed by the X axis, the Y axis, and the Z axis, but the positional relationships among components according to the present disclosure are not limited to orthogonal relationships.

The invention claimed is:

1. An isolator comprising:
a first waveguide and a second waveguide on a substrate having a substrate surface, the first waveguide and the second waveguide located along the substrate surface and overlapping each other as viewed from the substrate,
wherein the first waveguide and the second waveguide each include a core and a clad,
the core has a first surface facing the substrate surface, and a second surface opposite to the first surface,
the clad i contacts the first surface and the second surface of the core,
the first waveguide has a first end and a second end, and has a port for input and output of electromagnetic waves at each of the first end and the second end,
the core of the second waveguide includes a non-reciprocal member in at least one part of a cross section intersecting a direction in which the second waveguide extends,
a length of the second waveguide is an odd multiple of a coupling length of the first waveguide and the second waveguide with respect to electromagnetic waves propagating from the second end to the first end,
a length of the second waveguide is calculated according to the following formula:

$$L = m\lambda_0/2|(n_{even} - n_{odd})|$$

where L denotes the length of the second waveguide, $n_{even}$ and $n_{odd}$ respectively denote an even mode refractive index and an odd mode refractive index for electromagnetic waves propagating from the second end to the first end in a coupling of the first waveguide and the second waveguide, m denotes an odd number, and $\lambda_0$ denotes a wavelength in a vacuum, and
a length of the second waveguide is an even multiple of a coupling length of the first waveguide and the second waveguide with respect to electromagnetic waves propagating from the first end to the second end.

2. The isolator according to claim 1, wherein the both ends of the second waveguide each have a cut surface, and wherein a normal vector of the cut surface has a component in a direction intersecting a propagation direction of electromagnetic waves in the second waveguide.

3. A light source device comprising:
an optical isolator comprising the isolator of claim 1; and
a light source is optically connected to the port.

4. An optical transmitter comprising:
a light source device including an optical isolator comprising the isolator of claim 1;
a light source is optically connected to the port; and
a light modulation function.

5. An optical amplifier comprising:
an optical isolator comprising the isolator of claim 1.

6. An isolator comprising:
a first waveguide having a first end and a second end, and having a port for input and output of electromagnetic waves at each of the first end and the second end; and
at least one second waveguide having both ends located along the first waveguide, and coupled to the first waveguide,
wherein at any operation frequency, the first waveguide and the at least one second waveguide have a coupling coefficient in a case where electromagnetic waves input from the second end propagate toward the first end that is larger than a coupling coefficient in a case where electromagnetic waves input from the first end propagate toward the second end, and
wherein the first waveguide has a matching adjustment circuit at a part of the first waveguide that is coupled to the at least one second waveguide.

7. The isolator according to claim 6, wherein the at least one second waveguide has an electromagnetic wave absorbing member on an outer side of each of the both ends.

8. A light source device comprising:
an optical isolator comprising the isolator of claim 6; and
a light source optically connected to the port.

9. An optical transmitter comprising:
a light source device including an optical isolator comprising the isolator of claim 6;
a light source optically connected to the port; and
a light modulation function.

10. An optical amplifier comprising:
an optical isolator comprising the isolator of claim 6.

11. An isolator comprising:
a first waveguide and a second waveguide on a substrate having a substrate surface, the first waveguide and the second waveguide arranged side by side along the substrate surface,
wherein the first waveguide and the second waveguide each include a core and a clad,
the first waveguide has a first end and a second end, and has a port for input and output of electromagnetic waves at each of the first end and the second end,
the core of the second waveguide includes a non-reciprocal member in at least one part of a cross section intersecting a direction in which the second waveguide extends,
a polarization direction of electromagnetic waves input to the first end is parallel to the substrate surface, the first waveguide includes a first dielectric and a second dielectric arranged in a direction parallel to the substrate surface, and the second dielectric is of a different type from the first dielectric,
the second waveguide includes a third dielectric, a fourth dielectric, and the non-reciprocal member arranged in the direction parallel to the substrate surface, and the fourth dielectric is of a different type from the third dielectric, and
the third dielectric, the fourth dielectric, and the non-reciprocal member are in contact in an in-plane direction of the substrate surface.

12. The isolator according to claim 11, wherein both ends of the second waveguide each have a cut surface, and wherein a normal vector of the cut surface of at least one of the each both ends has a component in a direction intersecting a propagation direction of electromagnetic waves in the second waveguide.

13. The isolator according to claim 11, wherein a length of the second waveguide is an odd multiple of a coupling length of the first waveguide and the second waveguide with respect to electromagnetic waves propagating from the second end to the first end, and wherein a length of the second waveguide is calculated according to the following formula:

$$L = m\lambda_0/2|(n_{even} - n_{odd})|$$

where L denotes the length of the second waveguide, $n_{even}$ and $n_{odd}$ respectively denote an even mode refractive index and an odd mode refractive index for electromagnetic waves propagating from the second end to the first end in a coupling of the first waveguide and the second waveguide, m denotes an odd number, and $\lambda_0$ denotes a wavelength in a vacuum.

14. A light source device comprising:
an optical isolator comprising the isolator of claim 11; and
a light source is optically connected to the port.

15. An optical transmitter comprising:
a light source device including an optical isolator comprising the isolator of claim 11;
a light source is optically connected to the port; and
a light modulation function.

16. An optical amplifier comprising:
an optical isolator comprising the isolator of claim 11.

17. An isolator comprising:
a first waveguide and a second waveguide on a substrate having a substrate surface, the first waveguide and the second waveguide arranged side by side along the substrate surface,
wherein the first waveguide and the second waveguide each include a core and a clad,
the first waveguide has a first end and a second end, and has a port for input and output of electromagnetic waves at each of the first end and the second end,
the core of the second waveguide includes a non-reciprocal member in at least one part of a cross section intersecting a direction in which the second waveguide extends, and
a length of the second waveguide is an odd multiple of a coupling length of the first waveguide and the second waveguide with respect to electromagnetic waves propagating from the second end to the first end, and a length of the second waveguide is calculated according to the following formula:

$$L = m\lambda_0/2|(n_{even} - n_{odd})|$$

where L denotes the length of the second waveguide, $n_{even}$ and $n_{odd}$ respectively denote an even mode refractive index and an odd mode refractive index for electromagnetic waves propagating from the second end to the first end in a coupling of the first waveguide and the second waveguide, m denotes an odd number, and $\lambda_0$ denotes a wavelength in a vacuum.

* * * * *